Nov. 10, 1936.　　　　E. L. FONSECA　　　　2,060,296
REMOTE INDICATING TEMPERATURE RESPONSIVE DEVICE
Filed Aug. 6, 1929
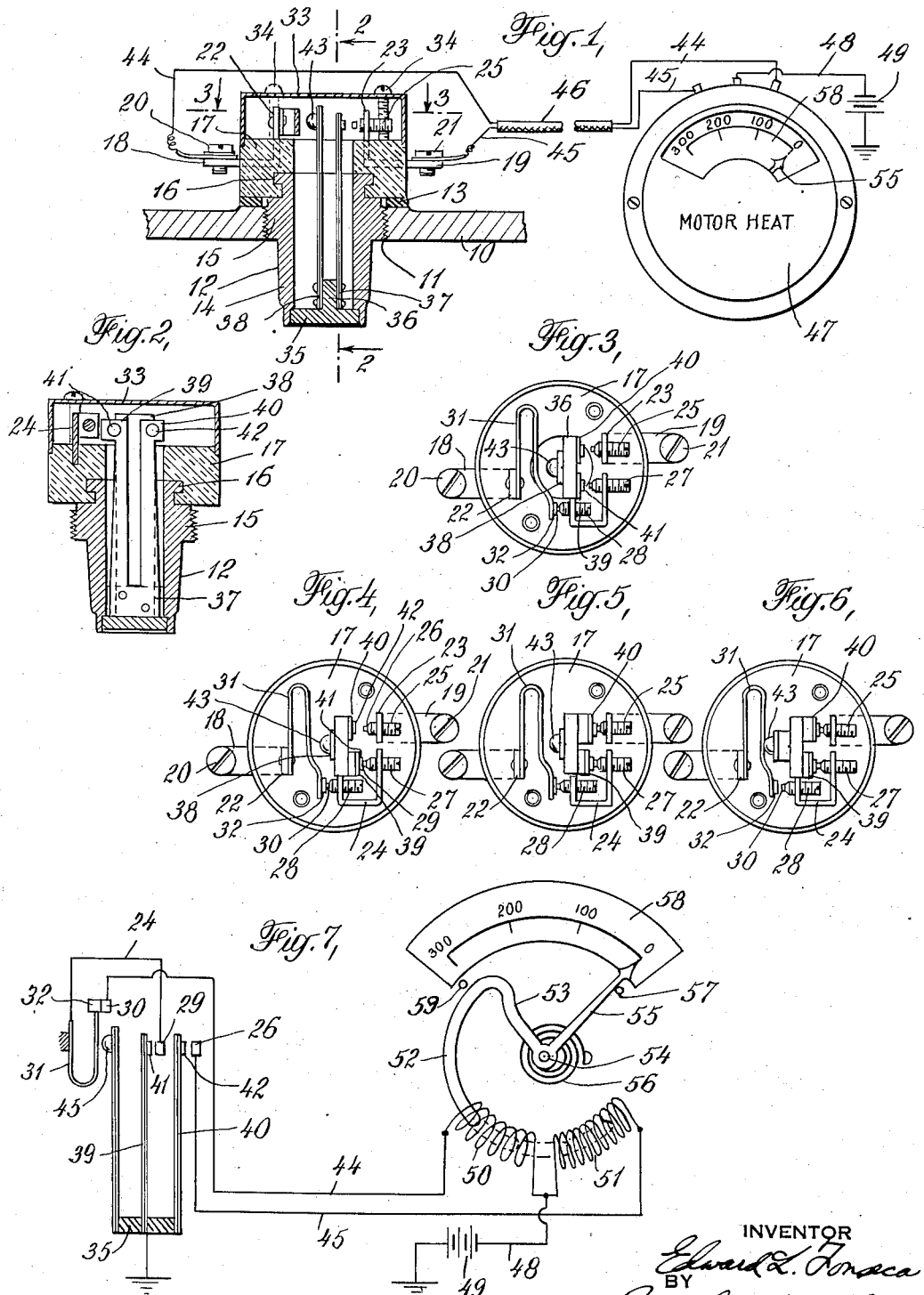
INVENTOR
Edward L. Fonseca
BY
ATTORNEYS Patented Nov. 10, 1936

2,060,296

UNITED STATES PATENT OFFICE 2,060,296

REMOTE INDICATING TEMPERATURE RESPONSIVE DEVICE

Edward L. Fonseca, Newark, N. J., assignor to The Wilcolator Company, Newark, N. J., a corporation of Delaware Application August 6, 1929, Serial No. 383,803

4 Claims. (Cl. 200—138)

This invention relates to remote-indicating temperature responsive devices in which thermostatic means exposed to varying temperatures of a body operate an indicator located at a remote point and calibrated to designate the various changing temperatures of the body. More particularly, the invention is concerned with a device which includes an electrical temperature indicator adapted to be mounted upon the dash of an automobile for indicating to the driver the instantaneous engine temperature as determined by a thermo-responsive device exposed to the heat of the engine, and an embodiment of the invention adapted to this purpose is described as an example of its use, but it is to be understood that the utility of the device is not limited to this particular adaptation.

It is well known that an automobile motor operates most efficiently within a certain temperature range, less efficiently at lower temperatures, and under abnormal and frequently dangerous conditions at temperatures exceeding this range. An abnormally high operating temperature may be caused by one or combinations of several things, such as an insufficient amount of engine cooling water or lubricating oil, a faulty oil or water circulating pump, or the like, each of which requires correction before the engine will again operate normally. The device of this invention is adapted to indicate to the driver these various conditions of the engine, and because each of these operating conditions lies within a substantial range of temperature, it is relatively unimportant for the driver to know what the exact temperature is, an approximate temperature indication being sufficient to serve as a warning.

In accordance with these considerations, the device of this invention includes thermo-responsive means preferably introduced into the cooling water jacket of the engine, and a visual indicating dial mounted upon the automobile dash and operated electrically by the aforesaid thermo-responsive means. The thermo-responsive means preferably consists of a multiple thermostatic switch comprising a plurality of thermostatic members exposed to the heat of the engine and adapted to close electrical contacts at predetermined temperatures, and other thermostatic members adapted to control at least one of said contact springs, whereby a plurality of circuit making and breaking actions are obtained by means of a relatively few number of thermostatic elements. This thermostatically controlled electrical contact making and breaking means at the engine controls the differential energization of a solenoid comprising a plurality of separate windings oppositely wound and of different numbers of turns of wire, the soft iron armature of which is positioned therein in accordance with the density of the magnetic flux produced thereby. The armature carries a pointer to move over a scale calibrated and graduated according to the temperatures at which the remote thermostatic members operate the corresponding electrical contacts, this pointer being arranged to designate predetermined temperature or other inscriptions which indicate to the driver the thermal condition of the engine.

For a better understanding of the invention, reference is made to the accompanying drawing, in which Figure 1 illustrates the device of this invention as applied to an automobile engine, and showing the thermo-responsive means in vertical section;

Fig. 2 is a vertical section of the thermo-responsive means as seen along the line 2—2 of Fig. 1;

Figs. 3, 4, 5 and 6 are plan views of the same with the cover cap removed, showing the thermostatically controlled switches in various operating positions; and Fig. 7 illustrates the device schematically, especially the electrical connections thereof.

In this drawing, numeral 10 designates the outer wall of the cooling water jacket of an automobile engine block, for example, this jacket wall 10 having a tapped hole 11 in which is adapted to be screwed or otherwise mounted the thermo-responsive electrical contact device 12 of this invention. A gasket 13 is interposed between the head of the device 12 and the outer surface of the water jacket wall 10 in order to seal the joint watertightly.

The thermo-responsive electrical contact device 12 includes a metal tube 14 preferably of iron or steel having the threaded shoulder 15 which is adapted to be screwed into the tapped hole 11 of the water jacket wall 10. The upper end of tube 14 is formed with a flange 16 over which is molded the head 17 of the device, which is preferably of some initially plastic insulating material, such as hard rubber, a phenolic resin or the like. Molded in this head 17 are electrical binding posts 18 and 19, carrying contact screws 20 and 21 respectively, and having respective lugs 22 and 23 projecting upwardly from the upper surface of head 17. Also molded in head 17 is an L-shaped bracket 24 projecting above the upper surface of head 17. Lug 23 carries an adjusting screw 25 having an electrical contact point 26, bracket 24 carries two adjusting screws 27 and 28 having respective contact points 29 and 30, while lug 22 carries the spring conductor 31 having a contact point 32 at its free end adapted to normally engage contact point 30 of screw 28, as shown particularly in Fig. 3. These parts are normally enclosed by a sheet metal cap 33, the edge of which fits into a groove formed in the upper surface of head 17, and which is secured in place by means of screws 34 tapped into the upper surface of head 17.

Secured in the lower end of tube 14 and sealed therein by means of solder or the like is a plug 35 made of some good thermal conducting metal. This plug 35 has a lug 36 on its inner surface, secured to opposite sides of which are bimetallic thermostat members 37 and 38, the former being slit to form two strips 39 and 40, upon the upper ends of which are secured the electrical contact points 41 and 42, respectively. The upper end of thermostatic member 38 carries a non-conducting button 43 which is adapted to engage conducting spring 31 to control the engagement of contacts 30 and 32, while contacts 41 and 42 mounted upon respective thermostatic members 39 and 40 are adapted to engage the contact points 29 and 26, respectively, of screws 27 and 25, respectively.

It will be seen that thermostatic members 39 and 40 are punched from the same bimetallic strip and therefore have the same coefficients of expansion, but the screw 27 is adjusted so that its contact point 29 lies normally in closer proximity to contact point 41 of thermostatic member 39 than contact point 26 of screw 25 to the corresponding contact point 42 of thermostatic member 40. Accordingly, contacts 29 and 41 will close before contacts 26 and 42, although the respective thermostatic members 39 and 40 move through the same distance in response to temperature changes. As an alternative arrangement, thermostatic members 39 and 40 may be made of separate strips having different coefficients of expansion, and the space between contacts 26, 42 and 29, 41 may be made substantially equal.

Secured respectively to binding posts 18 and 19 by respective screws 20 and 21, are the wires 44 and 45 of the cable 46 leading to the dash of the automobile and connected to the motor heat indicator 47, mounted thereon in a position readily observable by the driver of the automobile. Another wire 48 inserted through the wall of the indicator 47 is connected to one side of the battery 49 or other source of electrical energy carried by the automobile.

The indicator 47 is a fixed-coil type of galvanometer and includes a pair of coils 50 and 51, the former being connected at one end to wire 44 and at the other end to wire 48 and battery 49, and the other coil 51 being connected at one end to wire 45 and at the other end to wire 48 and battery 49. Coils 50 and 51 are oppositely wound, and the former having a fewer number of turns than the latter. For example, coil 50 may have one hundred turns while coil 51 may have three hundred turns, whereby a wide range of flux density may be obtained therein when the coils are employed as a solenoid. Adapted to move within both coils 50 and 51 is a soft iron armature 52, or other core having high magnetic permeability, preferably curved in shape and mounted on or forming part of the arm 53 pivoted about a pin 54 and carrying the pointer 55. The armature 52, arm 53 and pointer 55 are normally constrained to the right as seen in Fig. 7 by means of a hair spring 56, the limit of this constraint being determined by a stop 57 against which pointer 55 engages. Pointer 55 is adapted to move over a dial 58 graduated in degrees of motor temperature or any other notations, whereby the contact of the engine may be noted by reference to the position of the pointer 55 with respect to the inscriptions on the dial 58. Since such indications need only be relative, the inscriptions shown in Figs. 1 and 7 may be used for purposes of illustration, these inscriptions beginning with "0" and terminating with "300", and serving to identify the various effective number of turns of solenoid coil 50—51 in the manner to be described.

In operation, for indicating the temperature of an automobile engine for example, the cooling water circulating through the engine jacket 10 gradually heats up in cooling the cylinders of the engine, and in flowing around the tube 14 of the thermostatic contact device 12 which is immersed therein, the tube and the other submerged parts including plug 35 are heated. At a predetermined relatively low temperature, thermostatic member 39 flexes to the right as seen in Fig. 4 until its contact 41 engages contact point 29 of stationary screw 25, thus completing a circuit from tube and plug 35, which are grounded on the engine block 10, thermostatic member 39, contact 41 carried thereby, stationary contact 29, bracket 24, contact point 30 of screw 28, contact 32, contact spring 31, lug 22, binding post 18, wire 44, one hundred turn solenoid coil 50 of indicating device 47, wire 48, battery 49 and return to ground. The energization of solenoid coil 50 induces a proportionate flow of flux therethrough which causes soft iron armature 52 to center itself within coil 50, thereby rotating pointer 55 about its pivot 54 against the tension of hair spring 56 until the pointer 55 designates the inscription "100" on dial 58. This inscription may be utilized to indicate to the driver of the automobile that the engine has warmed up and is running at an efficient temperature.

As the engine temperature increases still further, thermostatic member 40, which moved with thermostatic member 39, moves further to the right than the latter as seen in Fig. 5, until its contact 42 engages contact point 26 on contact screw 25, thereby completing a circuit from ground, plug 35, thermostatic member, contact 42 carried thereby, contact 26 on screw 25, lug 23, binding post 19, wire 45, three hundred turn solenoid coil 51 in indicator 47, wire 48 and battery 49 to ground. Inasmuch as solenoid coil 51 is wound oppositely to solenoid coil 50 and has three hundred turns as compared to the one hundred turns of solenoid coil 50, the coils oppose each other to produce the net differential effect of two hundred turns of wire. This causes armature 52 to center itself jointly between the two coils 50 and 51, as shown in phantom in Fig. 7, whereby pointer 52 is turned about its pivot 54 against the tension of hair spring 56, so that it points to the inscription "200" of dial 58. This indicates to the driver of the vehicle that the engine is running hot, and that caution should be observed.

Should the engine run still hotter due to a deficiency of cooling water, lubricating oil, a defective water or oil circulating system or the like, the third thermostatic member 38 flexes in response to the heat of the cooling water, and moves in a direction opposite to the directions of movement of thermostatic members 39 and 40, i. e., to the left as seen in Fig. 6. The non-conducting button 45 carried by thermostatic member 38 engages contact spring 31 as shown in Fig. 6 and flexes it to break the connection between contact 32 carried by spring 31 and contact point 30 of screw 28. Because contacts 30 and 32 are in the circuit normally controlled by low temperature thermostatic member 39, which closed first, the the circuit thereof is broken by the separation of contacts 30 and 32. This disconnects and consequently de-energizes one hundred turn solenoid coil 50, leaving three hundred turn solenoid coil 51 still energized. The full flux produced by solenoid coil 51 causes armature 52 to center itself as shown in phantom in Fig. 7, whereby pointer 55 is rotated against the tension of hair spring 56 against stop 57 to designate the inscription "300" on dial 58. This informs the operator that the engine has reached a dangerous operating temperature and that something is wrong which requires correction.

As the engine cools down, the reverse operations take place, that is, thermostatic member 38 straightens to release its button 45 from contact spring 31 so that released contact spring 31 again closes contacts 30 and 32, whereby one hundred turn solenoid coil 50 is re-energized to oppose three hundred turn solenoid coil 51, leaving a flux induced by the net effective number of two hundred turns of wire. The hair spring 56 then returns armature 52 so that the wire 55 designates the inscription "200" on dial 58. As the engine cools still further, thermostatic member 40 straightens and separates contacts 42 and 26, whereby three hundred turn solenoid coil 51 is de-energized, leaving only solenoid coil 50 energized, so that hair spring 56 returns armature 52 until pointer 55 designates the inscription "100" on dial 58. Similarly, if the engine has stopped operating or has cooled down still further below efficient operating temperatures, thermostatic member 39 straightens, breaking connection between contacts 29 and 41, so that one hundred turn solenoid coil 50 is de-energized, whereby hair spring 56 returns released armature 52 so that pointer 55 designates the "0" inscription on dial 58 and rests against stop 57.

It will be seen that the present invention provides a remote indicting temperature responsive device particularly adapted for use on automobiles to designate engine temperatures, which is inexpensive to manufacture, simple in operation, and not likely to get out of order. The parts thereof are few and simple, and the device as a whole may be readily assembled and emplaced on the automobile without requiring the services of specially skilled workmen. While a preferred embodiment of the invention has been illustrated and described herein, it is to be understood that changes therein may be freely made within the scope of the invention, and that the device may be adapted to indicate the temperature changes of other heated bodies at a remote point with equal facility.

I claim:

1. In a thermostatic device, the combination of a plurality of thermo-responsive members, a corresponding number of sets of electrical contacts, each controlled by one of said members, an independent set of contacts connected in series with one of the first named sets of contacts, an independent thermo-responsive member, and a resilient member normally urging the said independent contacts into engagement and actuated by said independent thermo-responsive member to disengage said independent contacts at a predetermined temperature.

2. In a thermostatic device, the combination of a plurality of thermostatic members movable substantially uniformly in response to temperature variations, a corresponding number of electrical contacts engageable by said members, said contacts being spaced different distances from the corresponding members, an independent set of electrical contacts in series with one of said first-named contacts, and an independent thermostatic member for controlling the said independent set of contacts in response to a temperature different than that at which the first thermostatic members engage their corresponding contacts.

3. In a thermostatic device, the combination of a plurality of thermostatic members movable substantially uniformly in response to temperature variations, a corresponding number of electrical contacts engageable by said members, said contacts being spaced different distances from the corresponding members, an independent set of electrical contacts in series with one of said first-named contacts, spring means normally holding said independent contacts engaged, and an independent thermostatic member operable at a predetermined temperature to actuate said spring and open said independent contacts.

4. In a thermostatic device, the combination of a pair of thermostatic members movable substantially uniformly in response to temperature variations, a pair of electrical contacts engageable by said members, said contacts being spaced different distances from the corresponding members, an independent set of electrical contacts in series with the contact of said pair which is in closer relation to its corresponding member, and an independent thermostatic member for controlling the said independent set of contacts in response to a temperature different than that at which the first-named thermostatic members engage their corresponding contacts.

EDWARD L. FONSECA.